Jan. 3, 1967     D. SCARAMUCCI     3,295,547
FOLDABLE CHECK VALVE
Filed Feb. 10, 1964     2 Sheets-Sheet 1
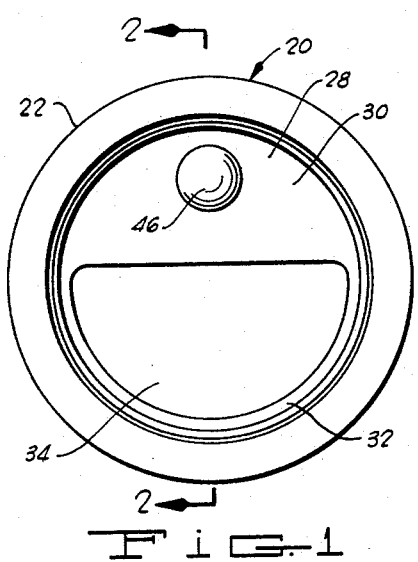
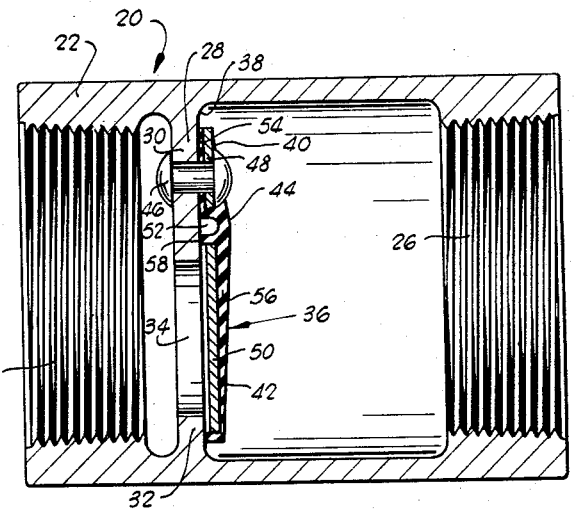
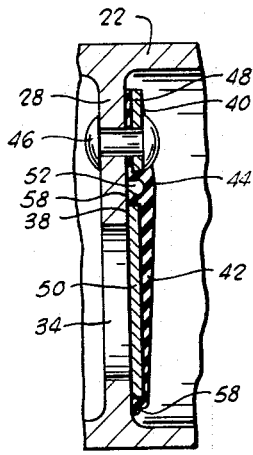
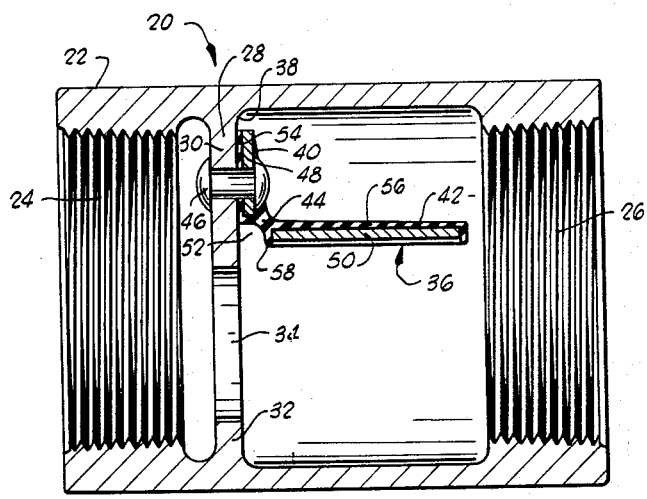
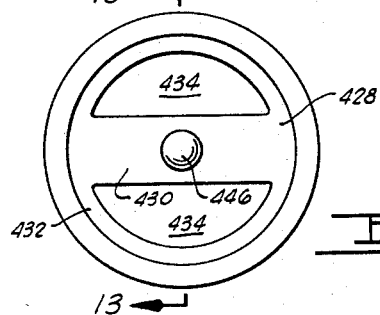
INVENTOR.
DOMER SCARAMUCCI
BY
*Dunlap Laney*
ATTORNEYS Jan. 3, 1967  D. SCARAMUCCI  3,295,547
FOLDABLE CHECK VALVE
Filed Feb. 10, 1964  2 Sheets-Sheet 2

INVENTOR.
DOMER SCARAMUCCI
BY
Dunlap & Laney
ATTORNEYS

United States Patent Office 3,295,547
Patented Jan. 3, 1967

3,295,547
FOLDABLE CHECK VALVE
Domer Scaramucci, 3245 S. Hattie St.,
Oklahoma City, Okla. 73129
Filed Feb. 10, 1964, Ser. No. 343,530
6 Claims. (Cl. 137—315)

This invention relates generally to valves useful in connection with fluid handling systems. More particularly, but not by way of limitation, this invention relates to resiliently hinged check valves useful in connection with fluid handling systems for passing fluid in one direction and blocking fluid flow in the opposite direction.

In the past, various types of check valves having resilient valve members utilizing resilient hinges have been constructed. Some of the check valves thusly constructed have attained some degree of success where the application involved relatively light use. Heretofore, however, check valves having resilient hinges have not been entirely satisfactory where the application required critical low pressure seals, prolonged useage, or where they were subjected to extremely high pressures. For the most part, the difficulties previously mentioned have resulted from attempts to utilize resiliently hinged check valves wherein the hinge had a short service life, the seal construction was inadequate, and, to some extent, the reinforcing provided was inadequate.

Flapper type check valves constructed for use in piping systems have generally included a bonnet located on one side thereof, providing access to the flapper and seat. The bonnets were required, in part, to provide for the insertion of the flapper and for access to the hinge mounting the flapper on the valve body.

Some flapper type check valves were constructed with an opening in the valve body through which the flapper hinge pin could be inserted. The opening was then plugged to prevent leakage from the interior of the check valve.

The provision of a bonnet and associated opening, or the provision of an opening for the insertion of the hinge pin, and the subsequent plugging of either type opening increases the cost of the valve, and, in addition, reduces the ultimate structural strength of the valve.

This invention generally contemplates an improved check valve employing a valve member comprising a mounting portion and a flapper portion joined by a resilient hinge portion. A planar seat is located within a generally tubular valve body. The seat has an aperture therein for the flow of fluid through the valve. The arrangement is such that the valve member may be folded and inserted through the downstream end of the body and the mounting portion is retained in juxtaposition with a portion of the seat by a retaining member which is also inserted through the ends of the valve body. Thus, no access openings, other than the inlet and outlet of the valve body are required. The flapper portion is adapted to close the aperture to prevent flow in one direction while permitting flow in the opposite direction.

It is, therefore, one object of the invention to provide an improved flapper type check valve that is easily and economically manufactured.

Another object of the invention is to provide an improved flapper type check valve that has the flapper pivotally mounted within the valve body without the necessity of forming an opening extending through the wall of the valve body.

Another object of this invention is to provide a check valve having a large flow passage therethrough and yet which does not require access openings, other than the inlet and outlet, for the insertion and removal of the valve member.

Still another object of the invention is to provide an improved flapper type check valve that has the flapper reinforced in such a manner that the valve can be used with relatively high fluid pressures.

One other object of the invention is to provide an improved flapper type check valve that is adapted to establish a fluid tight seal at relatively low pressures.

A further object of the invention is to provide an improved flapper type check valve that has a pressure responsive seal member adapted to form a fluid tight seal at relatively low pressures and wherein the seal formed will be augmented by increased pressure thereon.

The foregoing and additional objects and advantages of the invention will become more apparent as the following description is read in conjunction with the accompanying drawing wherein like reference characters denote like parts in all views and wherein:

FIG. 1 is an end view of a check valve constructed in accordance with the invention;

FIG. 2 is a cross sectional view of a check valve taken along the line 2—2 of FIG. 1;

FIG. 3 is a view similar to FIG. 2, but showing the flapper in the open position;

FIG. 4 is a view showing a portion of the check valve illustrating the deformation of the flapper seal in response to relatively high pressures applied thereto;

FIG. 12 is an end view of a check valve having a double flapper arrangement and also constructed in accordance with the invention; and, FIG. 13 is an enlarged cross sectional view of the check valve of FIG. 12 taken along the line 13—13.

Figure 5:
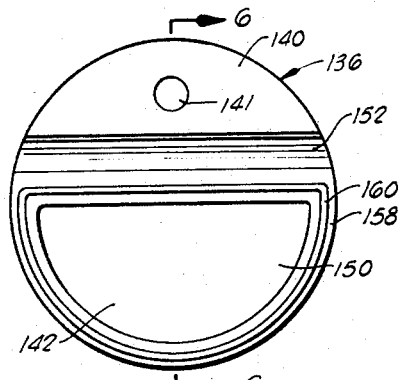
FIG. 5 is a plan view of a flapper having an alternate form of seal thereon.

Referring now to the drawing and to FIGS. 1 and 2 in particular, shown therein and generally designated by the reference character 20, is a flapper type check valve. As illustrated, the check valve 20 includes a generally tubular body 22 having an upstream threaded end 24 and a downstream threaded end 26. The ends 24 and 26 are suitably constructed for attachment to portions of a conduit (not shown). A planar seating portion 28, which may be more clearly seen in FIG. 1, includes an annular portion 32 which extends circumferentially around the interior of the valve body 22 and a segmental mounting portion 30 conterminous therewith forming an aperture 34. The aperture 34 provides for communication betweenn the upstream end 24 and the downstream end 26 of the check valve 20. The aperture 34 provides a flow path which in one direction is substantially equal to the diameter of the downstream end 26 of the valve body 22. In the other direction, the aperture 34 is less than the diameter of the downstream end 26 to provide the segmental mounting portion 30. The aperture 34 has a cross sectional area of at least one-half the flow area of either the upstream end 24 or the downstream end 26 of the valve 20.

A valve member 36 is shown in FIG. 1 as lying adjacent a downstream surface 38 of the planar seat 28. The valve member 36 includes a mounting portion 40, a flapper portion 42, and a resilient hinge portion 44 joining the mounting portion 40 with the flapper portion 42. The mounting portion 40 is held in juxtaposition with the mounting portion 30 of the planar seat 28 by means of a rivet 46. Any suitable fastener, such as a bolt and nut, or screw, may be utilized to retain the valve member 36 in the relation shown with the planar seat 28, but care should be taken that there is no possibility of the fastener becoming loose in the valve. It is important to note that the rivet 46, or other suitable fastener, is applied through the open ends 24 or 26 of the valve body 22. No opening need be formed in the exterior of the valve body 22 for mounting the valve member 36.

As shown, the valve member 36 also includes a reinforcing member 48, which is located in the mounting portion 40, and a reinforcing member 50, which is located in the flapper portion 42. The resilient hinge portion 44 has a groove 52 extending across the valve member 36 in the upstream surface of the valve member 36 between the mounting portion 40 and the flapper portion 42. The purpose of the groove 52 will be described more fully hereinafter.

The mounting portion of the valve member 36 includes, in addition to the reinforcing member 48, a covering 54 of resilient material which serves the dual purpose of sealing around the rivet 46 and providing a stronger and more secure bond between the hinge portion 44 and the reinforcing member 48.

The flapper portion 42 includes, in addition to the reinforcing member 50, a resilient covering on the downstream surface thereof which, like the resilient covering 54, provides a stronger bond between the hinge 44 and the flapper portion 42. A resilient bead 58 extends around the periphery of the reinforcing member 50 and projects upstream from the reinforcing member 50. The bead 58 projects from the reinforcing member 50 a sufficient distance so that the bead 58 will engage the surface 38 of the planar seat 28 prior to the engagement of the reinforcing member 50 with the surface 38.

In operation the check valve 20 will be placed between sections of conduit (not shown) of a fluid system, so that fluid from the system can flow into the check valve 20. FIG. 3 illustrates the position of the valve member 36 with fluid flowing from the upstream end 24 of the check valve 20 to the downstream end 26 thereof. As shown therein, the flapper portion 42 of the valve member 36 has been pivoted from the position shown in FIG. 2 about the resilient hinge portion 44 until the flapper portion 42 is substantially clear of the flow path of the fluid through the check valve 20. With the valve in the position shown in FIG. 3, it can be observed that the flexure of the resilient hinge 44 takes place in the reduced section of the resilient material adjacent the groove 52. The groove 52 has been provided to reduce the tension in the resilient material of the hinge 44, thereby increasing the life of the hinge material.

Should a reverse flow occur through the valve 20, the flapper portion 42 of the valve member 36 will return to the position shown in FIG. 2. The flapper portion 42 is returned partially by the biasing action of the resilient hinge portion 44 and, to some extent, by the reverse flow of the fluid through the check valve 20.

When a very low differential pressure exists across the chack valve 20, that is, where a slightly higher pressure exists at the downstream end 26 than at the upstream end 24, the bead 58 will engage the surface 38 of the planar seat 28, thereby forming a fluid tight seal, as shown in FIG. 2. Due to the relatively low pressure exerted across the flapper portion 42, the bead 58 will be deformed only enough to create the fluid tight seal.

Should a relatively high pressure be exerted against the flapper portion 42 from the downstream end 26 of the valve, the flapper portion 42 will move until the reinforcing member 50 engages the surface 38 of the planar seat 28 as illustrated by FIG. 4. The pressure responsive bead 58 is then deformed outwardly by engagement with the surface 38, maintaining and augmenting the fluid tight seal formed. The force resulting from additional pressure exerted on the flapper portion 42 will be carried by the reinforcing member 50 due to the physical engagement of the reinforcing member 50 with the planar seat 28. The seal formed by the pressure responsive bead 58 with the surface 38 will be augmented by the additional pressure exerted thereon. However, the bead 58 is not subject to extrusion because the bead is trapped by the engagement of the reinforcing member 50 with the planar seat 28. It should be emphasized that a check valve 20, constructed in accordance with the foregoing description, provides a very effective seal at relatively low differential pressures, as well as providing a highly effective seal at any pressure not exceeding the structural strength of the various parts of the valve itself. As described, the action of the pressure responsive bead 58 is such that the higher the pressure, the more effective the seal formed by the check valve 20.

The utilization of the resilient hinge portion 44 joining the flapper portion 42 and mounting portion 40 provides an additional important advantage during assembly of the valve 20. The valve member 36 can be folded about the hinge portion 44 and inserted through the downstream end 26 of the valve body 22 even though the flapper portion 42 must seal the aperture 34 which is, at least in one direction, substantially equal in size to the interior of the downstream end 26.

Figure 6:
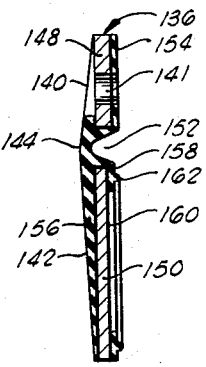
FIG. 6 is a cross sectional view of the flapper shown in FIG. 5 taken along the line 6—6.

FIGS. 5 and 6 illustrate an alternate form of valve member, designated generally by the reference character 136. As may be seen by comparing the valve member 136 with the valve member 36 of FIG. 2, the basic distinction is in the way in which the seal will be formed in cooperation with the planar seat 28. The valve member 136 includes a mounting portion 140, a flapper portion 142, and a resilient hinge portion 144. The mounting portion 140 is provided with a reinforcing member 148 and the flapper portion 142 is provided with a reinforcing member 150. The reinforcing members 148 and 150 are, in all respects, similar to the reinforcing members 48 and 50, respectively, of FIG. 2. The mounting portion 140 is provided with an opening 141 which is provided so that the valve member 136 can be mounted with a rivet 46, or the like, as previously described with respect to the valve member 36. A groove 152 is formed in the upstream face of the hinge portion 144 and extends all the way across the hinge portion to increase the flexibility of the hinge portion in the manner previously described in connection with the groove 52 of the embodiment shown in FIGS. 1–4.

The resilient material which forms the hinge portion 144, extends substantially over the mounting portion 140, providing a thin section of resilient material 154 to form a seal with the rivet 46. Likewise, the resilient material forming the hinge portion 144 extends over the flapper portion 142, as shown at 156, providing for an improved bond between the hinge and the flapper portion 142. As can best be seen in FIG. 5, a portion 158 of the resilient material extends around the periphery of the upstream surface 160 of the reinforcing member 158. Projecting from and coextensive with the resilient material portion 158 is a bead 162.

When the valve member 136 is installed in the valve body 22, the resilient material portion 158 and the bead 162 projecting therefrom will be in contact with the surface 38 of the planar seat 28. With fluid flowing from the upstream end 24 to the downstream end 26, the flapper portion 142 of the valve member 136 will be rotated upwardly about the hinge portion 144 similar to the action of the valve member 36, as shown in FIG. 3.

Should reverse flow occur, the flapper portion 142 will be biased into engagement with the planar seat 28, due to the resiliency of the hinge portion 144. Initially, the bead 162 will engage the surface 38, forming a fluid tight seal. An increase in pressure acting against the flapper portion 142 will deform the bead 162 so that the resilient portion 158 will engage the surface 38, continuing the seal formed therebetween. Should the valve be subjected to relatively high pressure from the downstream end 26, the resilient portion 158 and the deformed bead 162 will be extruded between the reinforcing member 150 and the planar seat 28 because no means are provided for restraining the resilient material portion 158. Subjecting the valve member 136 to sufficient high pressures will separate the resilient portion 158 from the surface 160 of the reinforcing member 150, resulting in a complete seal failure. The seal form described in connection with the valve member 136 is a very effective low pressure seal. It can be used with pressure differentials up to the extrusion point of the resilient material portion 158.

Figure 7:
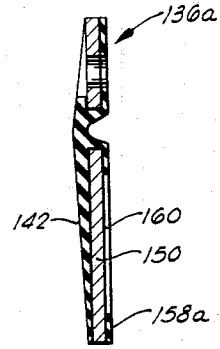
FIG. 7 is a cross sectional view of a flapper similar to the flapper shown in FIG. 6, but illustrating a different form of seal thereon.

FIG. 7 illustrates a slightly modified form of the valve member 136 and is generally designated by the reference character 136a. It can be observed by comparing FIGS. 6 and 7 that the difference between the two valve members is in the formation of the seal. The valve member 136a includes a resilient portion 158a which extends peripherally around the surface 160 of the reinforcing member 150. The resilient portion 158a does not include the coextensive and projecting bead 162, which is shown in FIG. 6. Without the bead 162, the valve member 136a, when installed in a valve body 22, depends upon the engagement of the resilient portion 158a with the surface 38 of the planar seat 28 to form the seal. As might be expected, the valve member 136a is not as effective as the valve member 136 at relatively low differential pressures. However, for applications wherein the anticipated differential pressures are in a slightly higher range, the valve member 136a will form effective fluid tight seals.

Figure 8:
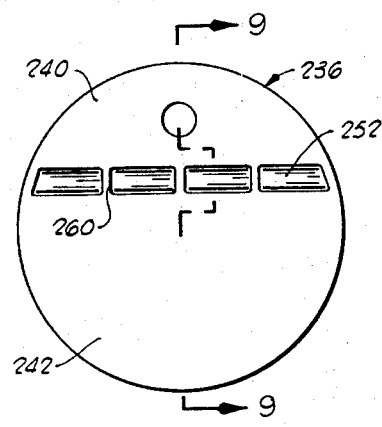
FIG. 8 is a plan view of a flapper illustrating an alternate hinge structure.
Figure 9:
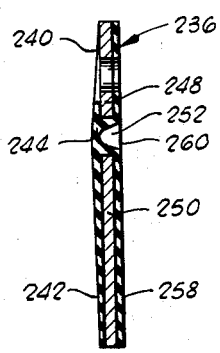
FIG. 9 is a cross sectional view of a flapper shown in FIG. 8 taken along the line 9—9.

The form of valve member shown in FIG. 8 and designated by the reference character 236 illustrates a variation in the hinge structure between a flapper portion 242 and a mounting portion 240. As shown therein, a hinge 244 is constructed from resilient material. The resilient material extends around the mounting portion 240 and is bonded to a reinforcing member 248 located therein. The material forming the hinge 244 also extends around and is bonded to a reinforcing member 250 located in the flapper portion 242. While the method of forming the seal between the flapper portion 242 and a seat, such as the seat 28 in the valve 20, is slightly different from those previously described, it should be understood that any of the previously described seal forms could be applied to the valve member 236.

The hinge portion 244 includes a plurality of grooves 252 arranged in end-to-end spaced relation generally transversely across the valve member 236 between the mounting portion 240 and the flapper portion 242. However, in this form of the hinge portion 244, web portions 260 extend transversely across the hinge portion 244 between the various grooves 252. The web portions 260 are provided to increase the strength of the hinge portion 244 and to provide a greater biasing force between the mounting portion 240 and the flapper portion 242. The web portions 260 are rather narrow so that little additional force is required to deflect the flapper member 242 when the valve member 236 is installed in a check valve, while at the same time increasing the structural strength of the hinge portion 244 and providing the additional biasing force previously described.

With the valve member 236 installed in a valve such as the check valve 20, the mounting portion 240 would be retained against the planar seat 28 by means of the rivet 46. It can be seen that fluids passing through the aperture 34 of the check valve 20 will deflect the flapper portion 242 to a position similar to that shown in FIG. 3. With the flapper portion 242 in this position, the web portions 260 of the hinge portion 244 will be stressed so that additional biasing force will be available to return the flapper portion 242 downwardly into engagement with the surface 38 of the planar seat 28 should reverse flow occur, or should flow cease through the valve 20. A fluid tight seal between the flapper portion 242 and the surface 38 of the planar seat 28 is attained due to the engagement of the resilient portion 258 on the flapper portion 242 on the reinforcing member 250 engaging the surface 38.

Figure 10:
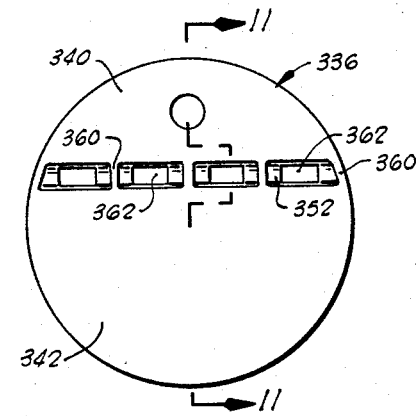
FIG. 10 is a plan view of a flapper illustrating another alternate hinge construction.
Figure 11:
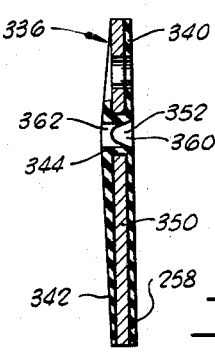
FIG. 11 is a cross sectional view taken along the line 11—11 of FIG. 10.

A valve member 336, illustrated by FIGS. 10 and 11, is essentially the same as the valve member 236, but has a slightly modified version of a hinge portion 344. The hinge portion 344, which extends betwen a mounting portion 340 and a flapper portion 342 of the valve member 336, is constructed from a resilient material. A plurality of grooves 352 extend transversely across the valve member 336 between the mounting portion 340 and flapper portion 342. The hinge portion 344 is provided with a plurality of web portions 360 which extend across the hinge portions 344, providing additional structural support and some additional biasing force, as do the web portions 260 of the valve member 236. The hinge portion 344 is also provided with a plurality of holes 362 which extend from the grooves 352 through the hinge portion 344. The holes 362 are arranged in such a manner that the force required to pivot the flapper portion 342 about the hinge portion 344 is substantially reduced, while at the same time maintaining a relatively high structural strength of the hinge portion 344.

The operation of the valve member 336, when installed in a check valve 20, will be identical with the operation as previously described with respect to the valve member 236 and will not be discussed with respect to the valve member 336. It should be pointed out that either of the hinge structures 244 and 344 described with respect to the valve members 236 and 336 can be used with any of the previously described valve members.

Figure 13:
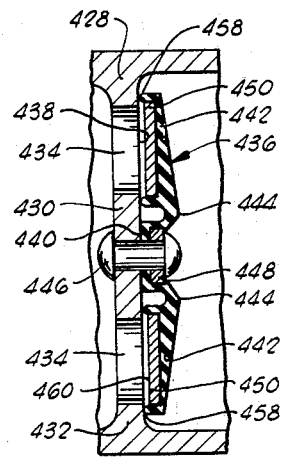

FIGS. 12 and 13 illustrate an application of a structure similar to that shown in FIG. 2 to form a double flapper type check valve. As shown in FIGS. 12 and 13, the seat 428 includes a circumferentially extending portion 432 and a transversely extending portion 430 defining a pair of apertures 434. The apertures 434 are of such a size that one dimension thereof will be substantially equal to the diameter of a downstream end (not shown) of the check valve. In the other direction, the dimension of the apertures 434 is less than said diameter.

A valve member 436 includes a mounting portion 440 and a pair of flapper portions 442 joined to the mounting portion 440 by means of a pair of resilient hinge portions 444. The mounting portion 440 includes a reinforcing member 448 and the flapper portions 442 include reinforcing members 450. As shown in FIG. 13, the mounting portion 440 is held in juxtaposition with the transverse portion 430 of the planar seat 428 by means of a rivet 446 extending therethrough.

Each of the flapper portions 442 includes a peripheral bead 458 which extends upstream past the surfaces 460 of the reinforcing members 450. The beads 458 form a seal with the surface 438 of the planar seat 428.

The operation of the valve member 436 is substantially the same as the operation of the valve member 36. However, the valve member 436 has the two flapper portions 442 which are deflected by fluid flow through the apertures 434. Each of the flapper portions 442 is rotated about the hinge portions 444 in a manner similar to that shown in FIG. 3 for the valve member 36. Should the flow cease or should a differential occur in the reverse direction across the valve, then the flapper portions 442 will return to the position shown in FIG. 13, forming a fluid tight seal and preventing flow through the check valve in the opposite direction. The hinge portions 444, as applied to the valve member 436 may, of course, be formed similar to the hinge portion 244 of the valve member 236 or the hinge portion 344 of the valve member 336.

It should be apparent from the foregoing description that the check valve therein described incorporates a method of mounting the valve member whereby no opening is necessary through the exterior wall of the valve. The exclusion of such an opening necessarily increases the strength of the valve and reduces the cost of manufacture. The valve member of each embodiment described is mounted utilizing a fastener inserted through the open ends of the check valve.

A preferred form of the check valve constructed in accordance with the invention includes a reinforced valve member having the sealing means thereon so constructed that a fluid tight seal can be attained at relatively low differential pressure and maintained to the structural limit of the valve. The seal formed will, in fact, be augmented by the increase in differential pressure.

It should also be pointed out that the embodiments described herein are by way of example only, and it should be understood that many variations and modifications can be made therein without departing from the spirit of the invention or the scope of the annexed claims.

What I claim is:

1. A check valve including:
   a generally tubular valve body having upstream and downstream ends of smaller inner diameter than the inner diameter of the valve body between said ends;
   a generally planar seat extending transversely across the valve body between the upstream and downstream ends having an aperture therethrough surrounded by a seating surface on the downstream side of the seat, the distance across the aperture in one direction being substantially equal to the inner diameter of the downstream end of the body, and the distance across the aperture in another direction being less than the inner diameter of the downstream end of the valve body, said seat also having a mounting portion on the downstream side thereof adjoining the seating surface;
   a valve member of larger transverse dimensions than the inner diameter of the downstream end of the valve body having a mounting portion and a flapper portion joined by a resilient hinge portion, whereby the mounting portion and flapper portion may be folded toward one another for insertion of the valve member through the downstream end of the body;
   said mounting portion including a rigid material, plate-like reinforcing portion and resilient sealing material adapted to seal against the mounting portion of said valve seat;
   said flapper portion including a rigid material, plate-like reinforcing portion having transverse dimensions greater than the respective dimensions of said aperture to span across said aperture when the valve is closed; and
   means for securing said mounting portion of the valve member in sealed relation against the mounting portion on the downstream side of said planar seat.

2. The check valve of claim 1, wherein the resilient hinge portion is further characterized in that:
   the hinge portion has a plurality of grooves in the upstream surface thereof extending the width of said hinge portion between said mounting portion and flapper portion and having a plurality of web portions extending across said hinge portion.

3. The check valve of claim 1, wherein the resilient hinge portion is further characterized in that:
   the hinge portion has a plurality of grooves in the upstream surface thereof extending the width of said hinge portion between said mounting portion and flapper portion;
   a plurality of web portions extending across said hinge portion; and,
   a plurality of openings extending through said hinge portion between said web portions.

4. The check valve of claim 1 wherein said valve member is further characterized in that:
   the flapper portion and mounting portion are composed of a mass of resilient material having said relatively rigid reinforcing members in each of said portions.

5. The check valve of claim 4, wherein the valve member is further characterized in that:
   the resilient material of the flapper portion extends around the peripheral edges thereof and projects past the upstream face thereof to form a peripheral, pressure responsive sealing lip adapted to sealingly engage the seating surface around said aperture.

6. A check valve including:
   a tubular valve body having upstream and downstream ends of smaller inner diameter than the inner diameter of the body between said ends;
   a generally planar seat extending transversely across the valve body, the seat having a mounting portion extending across the body and an annular portion extending circumferentially around the inner periphery of the body to form a pair of apertures, each aperture being surrounded by a seating surface which faces downstream, the distance across each aperture being substantially equal to the inner diameter of the downstream end of the body in one direction and less than the inner diameter of the downstream end of the body in another direction;
   a valve member of larger transverse dimensions than the inner diameter of the downstream end of the valve body having a mounting portion joined by a resilient hinge portion to a pair of flapper portions, whereby the flapper portions may be folded toward one another for insertion of the valve member through the downstream end of the body; and
   means for retaining said mounting portion in juxtaposition with the mounting portion on the downstream surface of said planar seat;
   each of said flapper portions including a platelike, rigid material reinforcing member having transverse dimensions greater than the dimensions of the respective aperture to span across the respective aperture when the valve is closed.

References Cited by the Examiner

UNITED STATES PATENTS

| 31,794 | 3/1861 | Evans | 137—515.5 X |
| 654,321 | 7/1900 | O'Crowley | 137—512.15 X |
| 2,378,613 | 6/1945 | Young | 137—525.3 |
| 2,397,269 | 3/1946 | Kelly | 137—516.29 |
| 2,859,771 | 11/1958 | Blagg | 137—512.15 |
| 3,042,290 | 7/1962 | Fraebel | 137—512.15 X |
| 3,128,785 | 4/1964 | Krummel | 137—525.3 X |
| 3,152,608 | 10/1964 | Morrison | 137—525.3 |

WILLIAM F. O'DEA, *Primary Examiner.*

HAROLD WEAKLEY, *Examiner.*